United States Patent [19]
Vaughan et al.

[11] 3,986,622
[45] Oct. 19, 1976

[54] TRAVELING SLOT FEEDER

[75] Inventors: Warren R. Vaughan, Belleville; Matthieu Suykens, Plainfield, both of Canada

[73] Assignee: Allis-Chalmers Canada, Limited, Milwaukee, Wis.

[22] Filed: Dec. 30, 1975

[21] Appl. No.: 645,324

[52] U.S. Cl. ............................ 214/15 D; 198/534; 222/144.5
[51] Int. Cl.² ........................................ B65G 47/18
[58] Field of Search ................... 198/49, 51, 54, 56, 198/57, 53 A; 214/15 R, 15 D, 15 E, 17 R, 17 D; 222/136, 135, 144.5; 193/4

[56] References Cited
UNITED STATES PATENTS

| | | | |
|---|---|---|---|
| 2,815,134 | 12/1957 | Borrowdale | 214/15 E |
| 3,826,354 | 7/1974 | Patz | 198/57 |

Primary Examiner—Allen N. Knowles
Assistant Examiner—Hadd Lane
Attorney, Agent, or Firm—Charles L. Schwab

[57] ABSTRACT

A bulk material handling apparatus includes a traveling slot feeder which runs on tracks at opposite sides of the endless belt conveyor beneath a row of bins permitting selective emptying of the bins. The feeder includes inclined, shiftable side skirts which can be adjusted to vary the width and elevation of the unloading slot and an adjustable striker at the downstream end of the feeder which establishes the contour and height of the bulk material deposited on the endless belt conveyor. The material handling apparatus may employ power means so as to permit remote control of the bin emptying operation and adjustment of the skirts and striker. The invention is illustrated in a ship where remote control is a particularly desirable feature to reduce space for workmen in the bottom of the ship and to reduce exposure of workmen to dusty working conditions.

24 Claims, 14 Drawing Figures

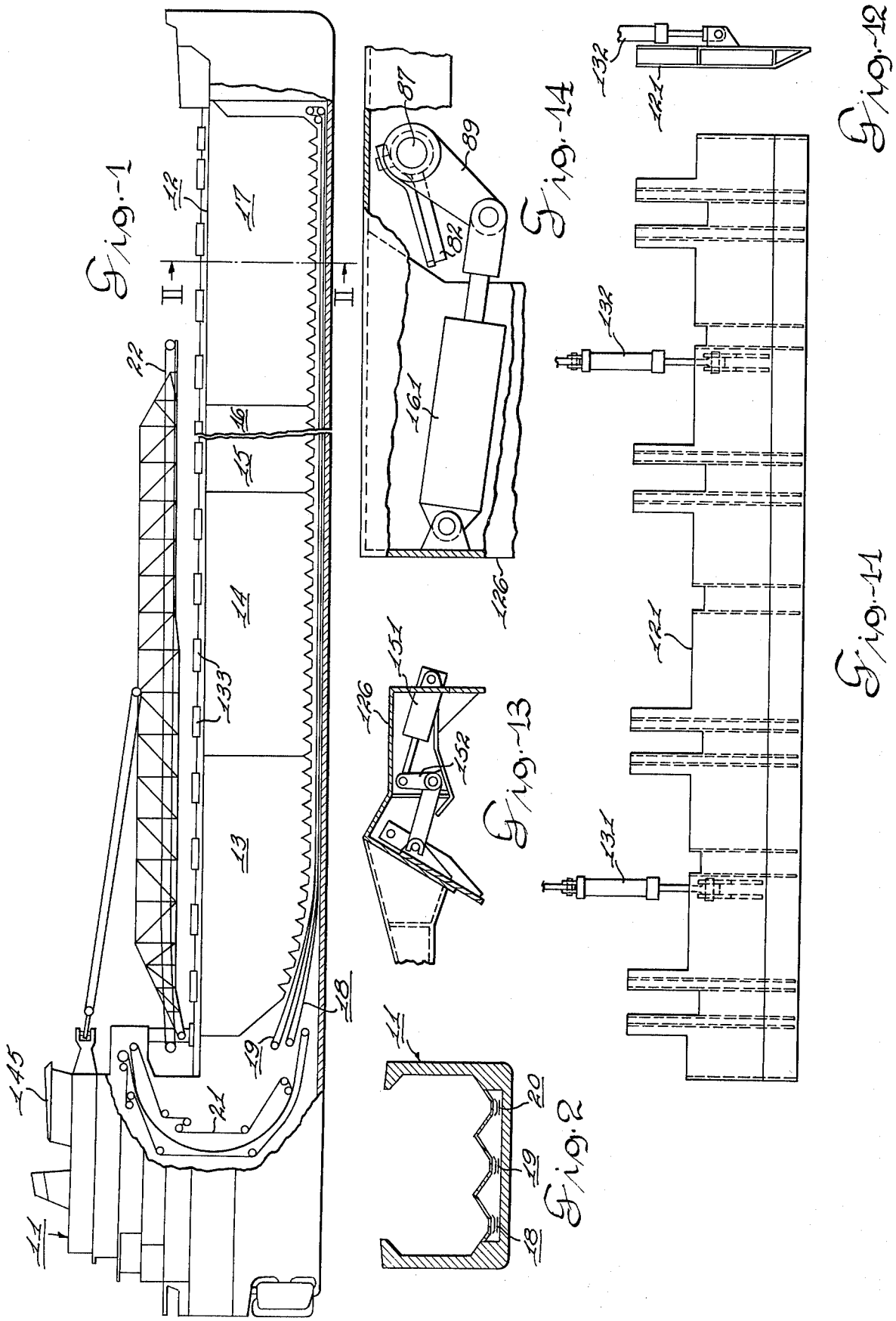

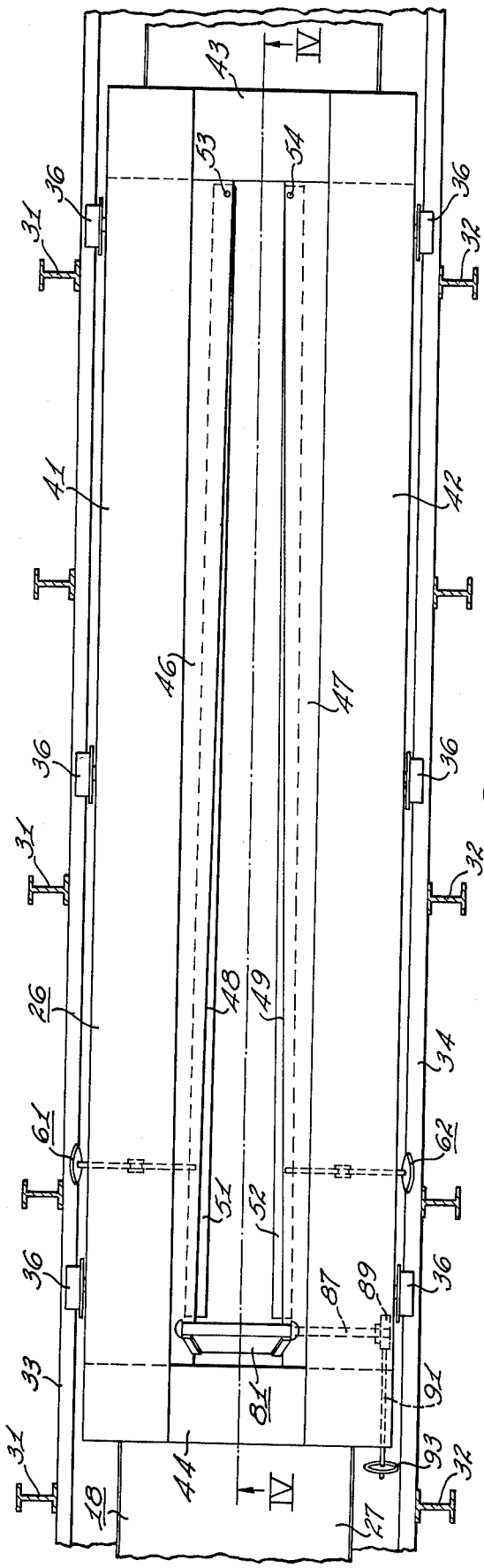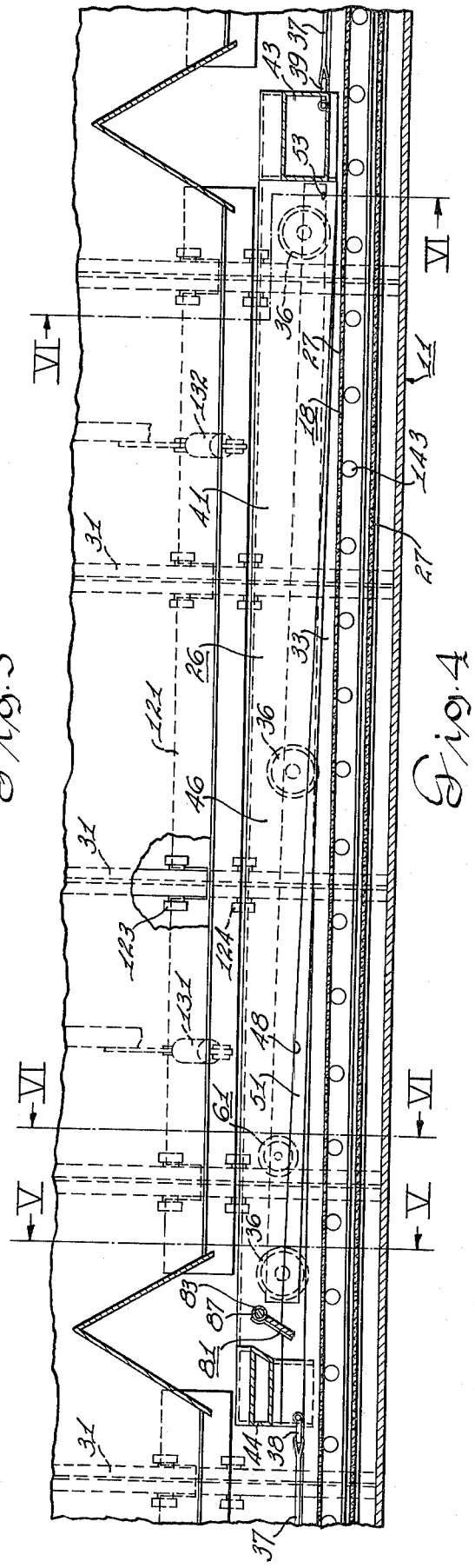

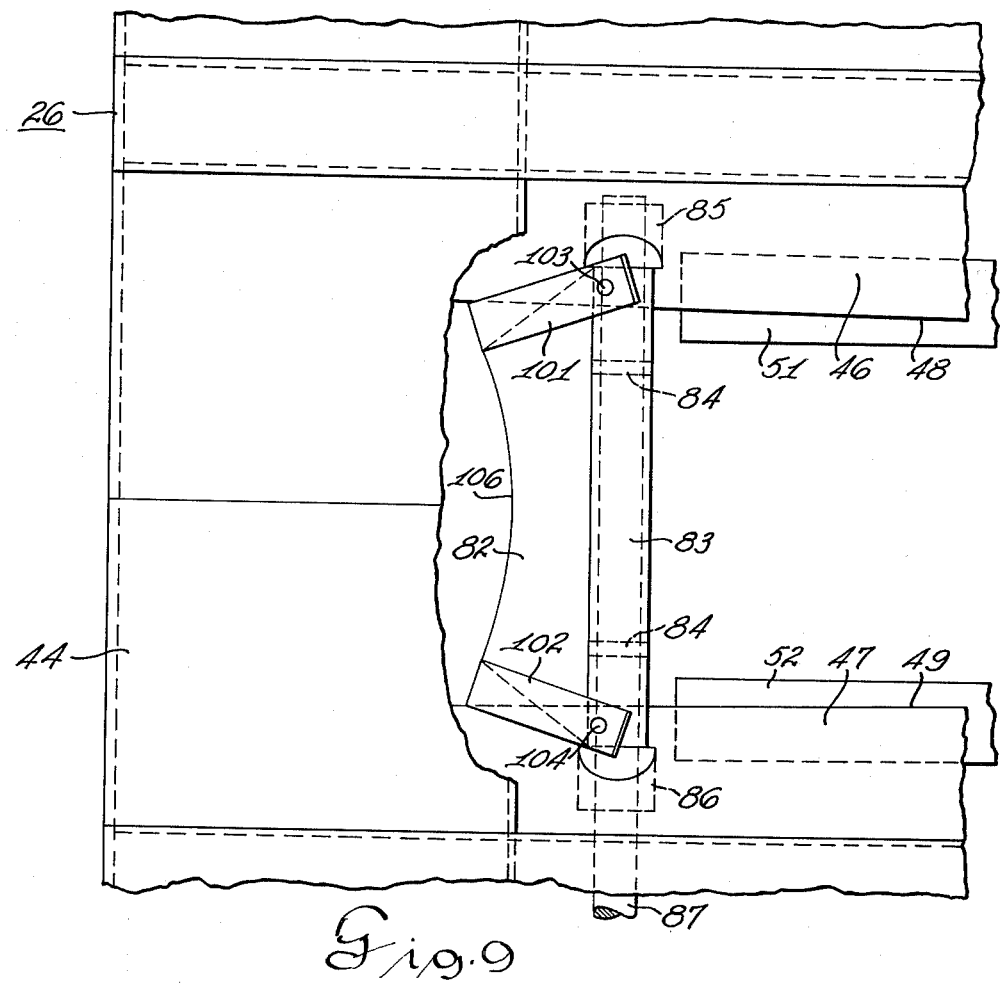
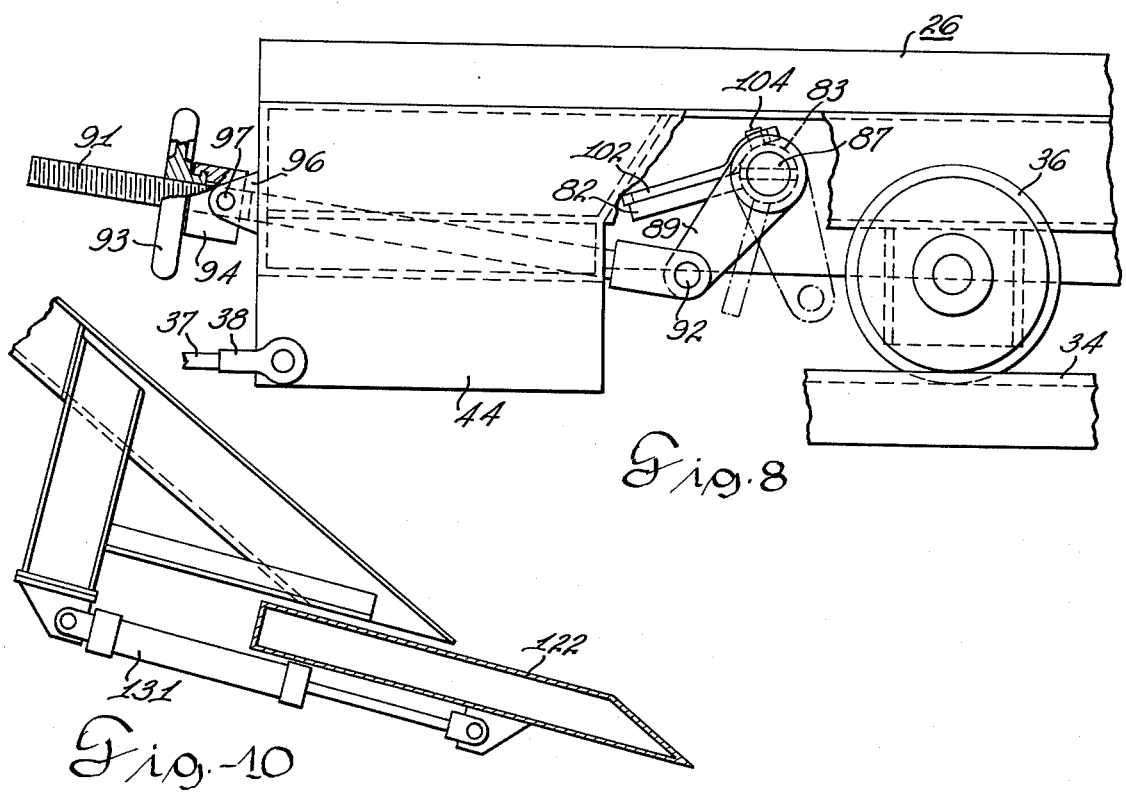

3,986,622

TRAVELING SLOT FEEDER

BACKGROUND OF THE INVENTION

Heretofore others have suggested the use of slot feeders such as shown in U.S. Pat. Nos. 2,650,693; 1,447,069; 1,234,532 and British Pat. No. 1,144,721. Also heretofore, it has been suggested that the bin discharge gates above an endless belt conveyor be tapered as shown in U.S. Pat. No. 3,464,536. In the May 1968 issue of the Mining Engineering magazine published by the Society of Mining Engineers there is illustrated and discussed a tapered slot feeder with a gate, for instance as disclosed on page 71. U.S. Pat. No. 2,815,134 shows a bulk handling ship with a traveling feeder on rails which is movable to a series of unloading positions under horizontally aligned holds of a ship permitting selective unloading onto an endless belt conveyor.

BRIEF DESCRIPTION OF THE PRESENT INVENTION

In the present invention a traveling slot feeder is provided above an endless conveyor belt which is disposed beneath a series of bins adapted to receive various types of granular bulk material. The traveling slot feeder has adjustable side skirts and an adjustable striker permitting the feeder to be adjusted to properly deposit various types of granular material onto the endless belt conveyor. Different bulk materials have different flow rates, some flowing so freely they tend to flow over the sides of the unloading belt. The adjustable slot feeding apparatus of the present invention can be adjusted to provide the correct flow rate. Some materials tend to flow unevenly with consequent uneven loading of the belt. The elongated discharge slot helps to even out the belt loading and the striker may be adjusted to provide a uniform contour of material deposited onto the belt. By adjusting the striker plate and side skirts it is possible to unload coal from one bin, shift to another serially arranged bin containing a dissimilar granular material, such as crushed rock or iron ore pellets, adjust the skirts and striker plate and then efficiently feed such dissimilar material onto the belt. One embodiment of the present invention utilizes power means for adjusting the skirts and striker plate thereby permitting remote control of these components of a traveling slot feeder so as to quickly adjust the feeder for the material being unloaded without requiring the presence of a workman in the usually dusty lower extremities of the ship where the feeder and conveyor belt are located.

It is an object of the presnt invention to provide an improved bulk material handling apparatus for selectively discharging material from bins disposed in a row by means of a traveling slot feeder with adjustable side skirts and an adjustable striker, which feeder evenly loads the bulk material onto a moving conveyor aligned with and disposed below the bins.

It is a further object of the present invention to provide a traveling slot feeder in a multiple hold, self-unloading ship for selectively feeding bulk material from the holds onto a moving conveyor.

It is a further object of the present invention to provide a traveling slot feeder in a self-unloading ship which has adjustable skirts to change the width of the slot and an adjustable striker whereby the feeder may be adjusted to properly feed various bulk materials onto a moving conveyor.

It is a further object of the present invention to provide a traveling slot feeder which may be positioned and adjusted by remote control means to efficiently unload a row of holds of a ship containing different bulk materials without necessitating the presence of a workman in the dusty atmosphere of the lower part of the ship.

DESCRIPTION OF THE DRAWINGS

FIG. 1 is a side view of a bulk material transport ship with parts broken away to show the material handling apparatus and holds of the ship;

FIG. 2 is a section view taken along the line II—II in FIG. 1;

FIG. 3 is a top view of a traveling slot feeder of the present invention;

FIG. 4 is a section view taken along the line IV—IV in FIG. 3;

FIG. 8 is an enlarged side view of one end of the traveling slot feeder with parts broken away to illustrate the adjustable striker;

FIG. 9 is an enlarged top view of the part of the traveling slot feeder illustrated in FIG. 8, with parts broken away for illustration purposes;

FIG. 10 is a view showing one of the hydraulic jacks employed to actuate the gates of the hold disposed above the traveling slot feeder;

FIG. 11 is a side view of the one skirt showing its two hydraulic actuators;

FIG. 12 is an end view of the structure shown in FIG. 11;

FIG. 13 is a view of a second embodiment of the feeder showing power means for adjusting the striker of the traveling slot feeder; and FIG. 14 illustrates power means for adjusting the striker of the second embodiment of the traveling slot feeder.

DETAILED DESCRIPTION OF THE INVENTION

Figures 6, 7:
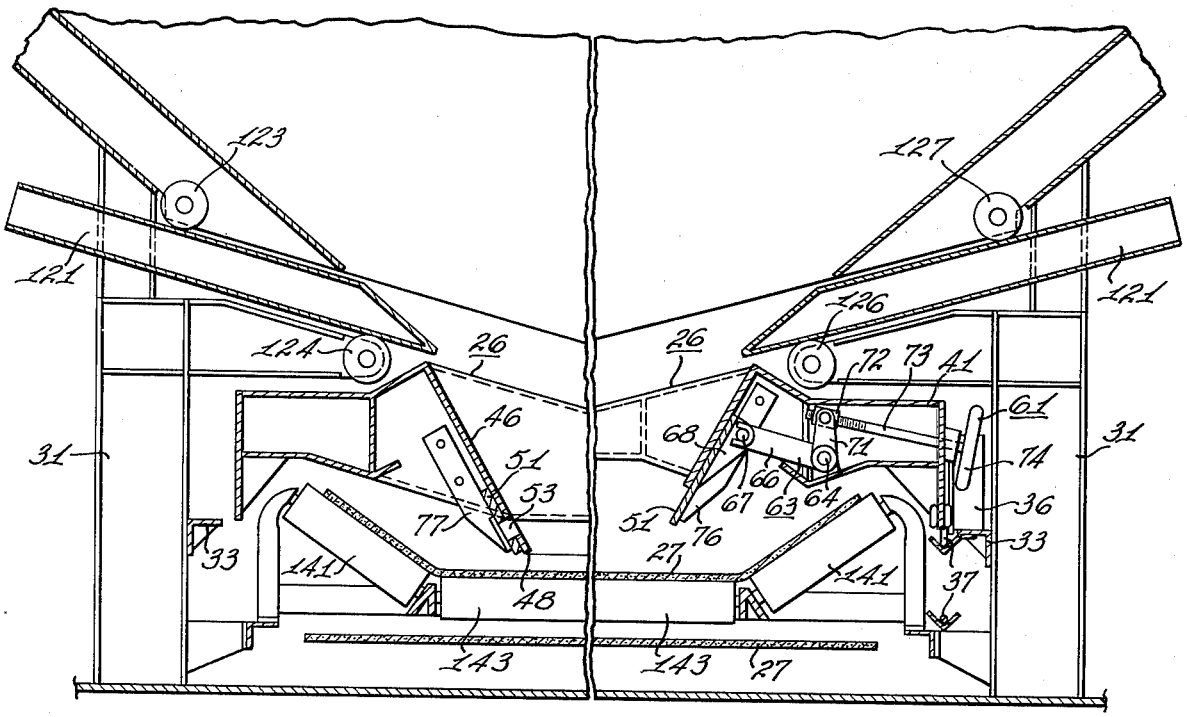
FIG. 6 is a section view taken along the line VI—VI in FIG. 4.
FIG. 7 is a section view taken along the line VII—VII in FIG. 4.

Referring to FIGS. 1 and 2, there is illustrated a bulk material handling ship 11 with a hold structure 12 including a row of bins in the form of side-by-side holds 13, 14, 15, 16 and 17. Each of the holds is provided with a plurality of hydraulically operated which will hereinafter be described, and the ship is provided with moving conveyors in the form of endless belt conveyors 18, 19, 20 which deliver bulk material deposited through the gates to a belt elevator 21 which in turn delivers bulk material to a boom mounted endless belt conveyor 22 which delivers the bulk material to the desired point of deposit on shore.

In order to increase the utility of self-unloading bulk material handling ships, it is desirable that they be capable of unloading a wide variety of bulk materials. Different bulk materials have widely different qualities which affect their flow rate and uniformity of discharge. For instance, coal has different gravity flow characteristics than iron ore pellets. Although adjustable gates have heretofore been used for controlling discharge of holds of a ship onto an endless belt conveyor, efficient uniform loading of the belt is difficult to achieve. While such a prior arrangement could be optimized for one type of bulk material, it would be found to be less satisfactory in unloading other types of bulk material. The present invention provides a traveling feeder which is adjustable to properly feed a wide variety of bulk materials onto a moving conveyor below the ship holds.

Figure 5:
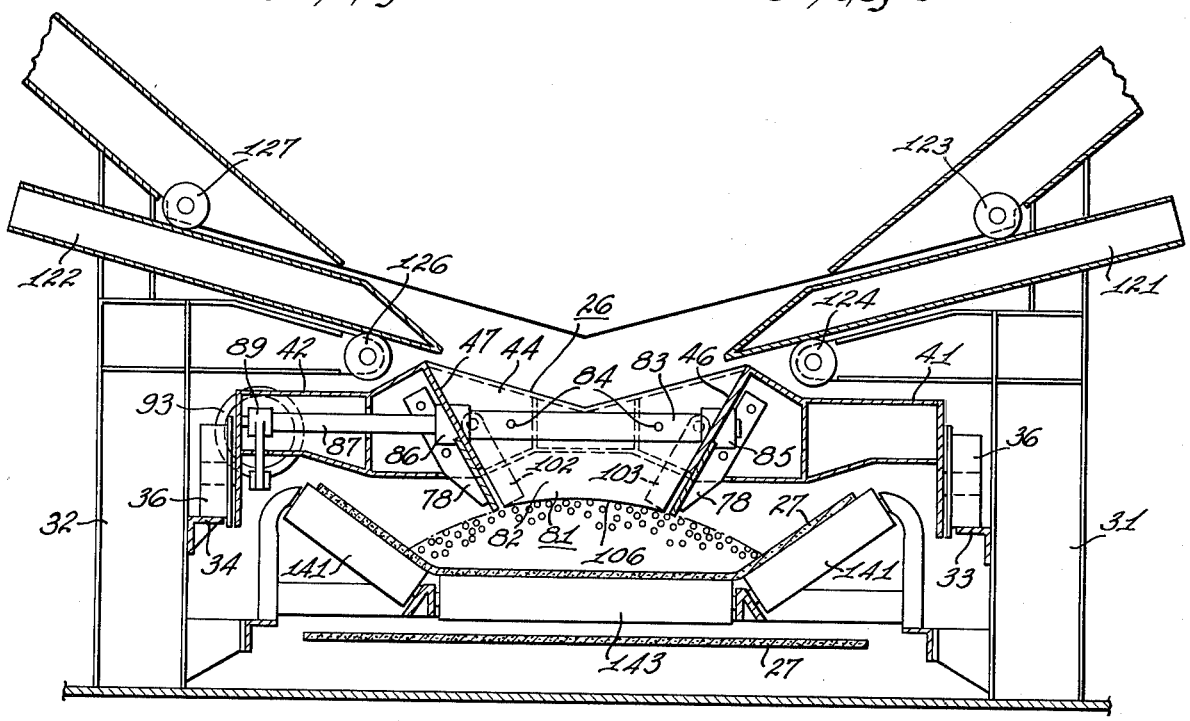
FIG. 5 is a section view taken along the line V—V in FIG. 4.

Referring to FIGS. 3 and 4, one embodiment of a traveling slot feeder 26 of the present invention is illustrated. The traveling slot feeder 26 is disposed below the holds of the ship 11 and above the endless belt 27 of the endless belt conveyor 18. It should be understood that three such traveling slot feeders are provided for the illustrated ship—that is, one in association with each of the three endless belt conveyors 18, 19 and 20. A suitable support structure is provided between the bottom of the ship and the holds for supporting the tapered bottom walls of the holds, the gates for the holds, the traveling slot feeders and the endless belt conveyors. Such support structure, as illustrated in FIGS. 5, 6 and 7, includes vertically disposed I-beams 31 and 32 to which guide means in the form of a pair of horizontally disposed channel rails 33 and 34 are secured as by welding. The traveling slot feeder 26 has six wheels 36 which support and guide the feeder on the rails 33 and 34. A suitable power means is provided to move the traveling slot feeder 26 along the rails 34. The power means may include an electrically powered winch and a cable 37 which is connected at the downstream end of the traveling slot feeder 26 by a clevis 38 and which is connected at the upstream end of the traveling slot feeder by a clevis 39. The traveling slot feeder 26 is basically a welded steel plate structure, the hopper portion of which includes a pair of longitudinal box sections 41 and 42 and a pair of bridging sections 43 and 44 at its upstream and downstream ends. The interior of the hopper portion of the feeder 26 is defined by a pair of longitudinally extending and upwardly diverging side walls 46 and 47. The bottom edges 48, 49 of the sloping side walls 46 and 47 are not as wide at the downstream end of the feeder as they are at the upstream end, thereby defining a tapered slot or opening at the longitudinal central part of the feeder which is of increasing width in the direction of movement of the endless belt conveyor 18. It will also be noted that the edges 48, 49 of the walls 46, 47 are of increasing height above the belt 27 of conveyor 18 in the direction of movement of upper run of the belt 27 as indicated by an arrow 50. The width or taper of the slot can be adjusted by a pair of skirts 51 and 52 in juxtaposed relation to the side walls 46, 47 which are pivotally connected at their upstream ends to the side walls 46 and 47 by pivot pins 53 and 54. The adjustable skirts, which in effect form extensions of the side walls 46, 47, are pivoted about their pivot pins 53 and 54 by manually operated mechanisms 61 and 62 for swinging movement in downwardly converging planes parallel to the side walls 46, 47.

Referring to FIG. 7, the adjusting mechanism 61 for raising and lowering skirt 51 includes a bell crank 63 pivotally mounted on the box section 41 of the feeder 26 by a longitudinally disposed pin 64. The bell crank 63 has a horizontally extending arm 66 with a bifurcated end in engagement with a longitudinally extending stud 67 secured as by welding to a bracket 68 welded to the skirt 51. The bell crank 63 also includes an upstanding bifurcated arm 71 to which an internally threaded sleeve 72 is trunnion mounted. The laterally inner end of a shaft 73 is threaded and is in threaded engagement with the threaded bore of sleeve 72. Rotation of a hand wheel 74 welded to the shaft 73 will cause vertical swinging movement of bell crank 63, thereby raising and lowering the downstream end of the skirt 51. the adjusting mechanism 62 is a reverse image of the adjusting mechanism 61. In order to insure movement of the skirts 51 and 52 parallel to the juxtaposed side walls 46 and 47, suitable guides 76, 77 and 78 are secured to the hopper portion of the feeder. The adjusting mechanisms 61, 62 are operable to provide infinite swinging adjustment of the skirts between predetermined limits.

As shown in FIGS. 3, 4, 5 and 8, a striker plate mechanism 81 is provided at the downstream end of the feeder 26 to assist in regulating the flow of bulk material onto the endless belt 27. The striker plate mechanism 81 includes a striker or striker plate 82 disposed in front of the bridging section 44 at the downstream end of the slot defined by the bottom edges of the side walls 46, 47. Striker plate 82 is rigidly secured to a cylindrical tube-like member 83 which is nonrotatably secured by pins 84 to transverse shaft 87 pivotally mounted in aligned horizontal sleeves 85, 86 welded to the side walls 46 and 47. A lever 89 is rigidly secured to the shaft 87 and has its downwardly extending end pivotally connected to the clevis end of a rod 91 by a pin 92. As shown in FIG. 8, the left end of the rod 91 is threaded and is in threaded engagement with a central threaded bore of a hand wheel 93. The hand wheel 93 is in cooperative rotatable engagement with a sleeve 94 pivotally connected by a pair of studs 97 to brackets 96 extending from the bridging section 44 of the feeder 26. In order for the striker plate 82 to fit into the space between the side walls 46 and 47 in its downwardly depending position, as illustrated in FIGS. 3 and 4, it is necessary that the plate taper to a predetermined bottom width. When the striker plate 82 is raised to the position shown in FIGS. 8 and 9, the laterally opposite edges of the bottom of the striker plate will move away from the sloping side walls 46 and 47 leaving wedge-shaped gaps between the striker plate and the side walls. In order to cover these gaps, a pair of hinged cover plates 101 and 102 are provided which are pivotally connected to the cylindrical tube 83 by pins 103 and 104. When the striker plate 82 is rotated upwardly to its raised position illustrated in FIGS. 8 and 9, the cover plates 101 and 102 will swing by gravity to the position illustrated in FIG. 9. When the striker plate 82 is lowered to the position shown in FIGS. 3 and 4, the cover plates 101 and 102 will be cammed inwardly by the sloping side walls 46 and 47. The bottom edge 106 of the striker plate is arch shaped to provide the desired contour and guantity of material deposited on the belt.

Each of the plurality of openings in the bottoms of the holds of the ship are closed by a pair of power operated gates 121 and 122 which are mounted on suitable rollers 123, 124, 126 and 127 and controlled by suitable hydraulic jacks 131 and 132. The holds may be loaded with bulk material through hatches 133.

As shown in FIGS. 5, 6 and 7, the endless belt 27 of conveyor 18 is supported by suitable troughing rollers 141 and central support rollers 143. The return loop of the endless belt 27 is supported by suitable support rollers (not shown). The endless belt conveyors 18, 19, 20 and the gates 121, 122 may be operated at a remote station such as the bridge 145 and there is normally sufficient space provided in the area of the conveyors and gates to permit manual adjustment of the feeder mechanism. In order to speed up unloading operations and avoid having workmen in the dusty, dirty lower portion of the ship, the skirts and striker plate mey be adjusted with power means from a remote location. Referring to FIG. 13, there is illustrated the use of a hydraulic jack 151 having its relatively extensible and contractible elements pivotally connected, respectively, to the skirt operating bell crank 152 and brackets on the side of a traveling slot feeder 126. Also, in this second embodiment of the invention, as is illustrated in FIG. 14, the striker mechanism may be operated by a suitable hydraulic jack 161. By using hydraulic jacks to adjust the skirts and striker plate, as well as the gates, it is possible to control all required adjustment and movement of the traveling slot feeder from a remote location thereby eliminating the need for a worker to be present in the lower part of the ship during unloading operations. Thus, the usual working space or headroom provided in bulk handling ships can be reduced so as to increase the size of the holds.

The present invention not only permits transport of different bulk materials on different runs of the ship but also permits different bulk material to be placed in different holds on a single run. The traveling slot feeder is readily adjustable to properly feed a wide variety of bulk materials such as coal, ore, crushed stone, sand, iron ore pellets and the like. The present invention increases the utility of a self-unloading ship, provides a greater return on investment, acheives better utilization of natural resources through improved efficiency of operation and improves working conditions by reducing worker exposure to dusty atmosphere conditions.

The embodiments of the invention in which an exclusive property or privilege is claimed are defined as follows:

1. Bulk material handling apparatus comprising:
   a row of bins for containing bulk material each of said bins having
   a discharge opening and
   gate means adjacent the discharge opening shiftable between open and closed positions whereby flow of said material from said bin through said discharge opening is permitted and prevented, respectively;
   a moving conveyor disposed below said discharge openings of said aligned bins for receiving bulk material from said bins and conveying said bulk material away from said bins by movement in a predetermined direction,
   a traveling feeder having longitudinally opposite upstream and downstream ends, said feeder being disposed above said conveyor and below one of said bins and including
   a longitudinally elongated bulk material discharge slot disposed above said moving conveyor,
   adjustable skirt means for varying the width of said discharge slot, and
   a vertically adjustable striker on the downstream end of said feeder, and
   guide means operatively associated with said feeder for guiding the latter in a predetermined path beneath said discharge openings.

2. The apparatus of claim 1 wherein said discharge slot is of increasing width along the length thereof in the direction of movement of said conveyor.

3. The appartus of claim 1 wherein the sides of said discharge slot are defined by the bottom edges of upward diverging side walls of said feeder and said bottom edges having increasing vertical spacing from said conveyor along the length thereof in the direction of movement of the conveyor.

4. The apparatus of claim 3 wherein said discharge slot is of increasing width along the length thereof in the direction of movement of said conveyor.

5. The apparatus of claim 1 wherein said skirt means include a pair of skirts pivotally connected to the upstream end of said feeder and disposed respectively along the longitudinal edges of said discharge slot.

6. The apparatus of claim 5 and further comprising selectively operable skirt adjusting means for pivotally adjusting said skirts whereby the taper of said discharge slot may be infinitely varied between predetermined limits.

7. The apparatus of claim 6 wherein said skirt adjusing means includes a hydraulic jack means operatively interposed between said feeder and said skirts.

8. The apparatus of claim 1 wherein said feeder includes downwardly converging side walls the bottoms of which define the sides of said discharge slot and wherein said skirt means includes a pair of skirts in juxtaposed relation to said side walls, respectively, and pivotally connected to the upstream end of said feeder, each of said skirts being infinitely adjustable about its pivot connection with said feeder between predetermined limits and forming in effect an extension of the associated side wall whereby the taper of said slot is changed upon pivotal adjustment of said skirt.

9. The apparatus of claim 8 and further comprising hydraulic jack means operatively interposed between said feeder and said skirts for pivotally adjusting the latter relative to said side walls.

10. The apparatus of claim 1 and further comprising power means on said feeder connected to said striker and selectively operable to adjust the vertical position of the bottom of said striker.

11. The apparatus of claim 10 wherein said striker is pivotally connected to said feeder on a horizontal axis transverse to the direction of movement of said conveyor.

12. The apparatus of claim 1 wherein said conveyor is an endless belt conveyor and said feeder is disposed in straddling relation thereto.

13. The apparatus of claim 1 wherein said guide means includes horizontally spaced parallel rails along said conveyor and wherein said feeder has wheels on opposite sides thereof in rolling engagement with said rails.

14. The apparatus of claim 1 and further comprising remotely controlled power means for operating said conveyor, moving said feeder along said path and adjusting said gate means, skirt means and striker.

15. The apparatus of claim 1 wherein said feeder includes downwardly diverging side walls and said striker includes a trapozoidal-shaped part which is pivotally connected to said feeder between said side walls for vertical swinging movement between raised and lowered positions about a horizontal axis transverse to the direction of travel of said conveyor and cover plates pivotally connected at their upper ends to said striker at opposite sides of said part on the downstream side of the latter, said cover plates covering the gap which exists between said part and said side walls when said striker is swung upwardly from its lowered position.

16. In a self-unloading ship with a row of bulk material handling holds arranged in side-by-side relation lengthwise of the ship and having longitudinally aligned bottom discharge openings permitting dischage of bulk material from the holds, the combination comprising:
- a moving conveyor mounted in said ship below said discharge openings for receiving bulk material from said holds by way of said discharge openings and operable to convey said material is one longitudinal direction,
- selectively operable gate means operatively associated with each discharge opeing shiftable between closed and open positions in which flow of material through the associated discharge opening is prevented and permitted, respectively,
- a traveling feeder having an upstream end and a downstream end, said feeder being disposed below said holds and above said moving conveyor and having a hopper portion adapted to receive material discharge from a discharge opening of one of said holds when said feeder is positioned thereunder, said hopper including
  - a pair of longitudinally extending and upwardly diverging side walls with laterally spaced apart bottom edges defining a longitudinally elongated discharge slot, and
  - a pair of skirts in juxtaposed relation to the laterally outer sides of said side walls,
  - mounting means adjustably connecting said skirts to said feeder permitting shifting movement of said skirts whereby the lower portions thereof form extensions of said side walls to change the configuration of said discharge slot, and
  - a striker mounted on the downstream end of said feeder for adjustment between raised and lowered positions, and
- guide means in said ship operatively associated with said feeder for guiding the latter in a predetermined longitudinal path beneath said discharge openings and above said moving conveyor permitting movement of said feeder to discharge stations beneath said discharge openings whereby said feeder is selectively positionable to receive discharge of bulk material through any selected one of said discharge openings.

17. The combination of claim 16 and further comprising power means operatively associated with said gate means, feeder, skirts and striker permitting remote control of said gate means, positioning of said feeder, movement of said skirts and adjustment of said striker.

18. The combination of claim 16 wherein said skirts are pivotally connected to the upstream end of said feeder for swinging movement in downwardly diverging planes.

19. The combination of claim 18 wherein said bottom edges of said side walls diverge from one another in said downstream direction.

20. The combination of claim 19 wherein said bottom edges are spaced a greater distance above said moving conveyor at their downstream ends than at their upsteam ends.

21. The combination of claim 20 wherein downward swinging adjustment of said skirts extends the lower ends of the latter beyond the lower edges of the side walls whereby the skirts become in effect extensions of said side walls and said slot is narrowed.

22. The combination of claim 16 wherein said striker is pivotally connected to said feeder for swinging movement about a transverse horizontal axis between said raised and lowered positions.

23. The combination of claim 22 wherein the bottom edge of said striker is arch shaped.

24. The combination of claim 16 wherein said conveyor is an endless belt conveyor and said feeder is disposed in straddling relation thereto.

* * * * *